(12) United States Patent
Xu

(10) Patent No.: US 10,534,484 B2
(45) Date of Patent: Jan. 14, 2020

(54) ZERO-DIMENSIONAL BASELINE MANAGEMENT

(71) Applicant: Synaptics Incorporated, San Jose, CA (US)

(72) Inventor: Richard Xu, Shanghai (CN)

(73) Assignee: Synaptics Incorporated, San Jose, CA (US)

( * ) Notice: Subject to any disclaimer, the term of this patent is extended or adjusted under 35 U.S.C. 154(b) by 10 days.

(21) Appl. No.: 15/604,352

(22) Filed: May 24, 2017

(65) Prior Publication Data

US 2018/0203542 A1   Jul. 19, 2018

(30) Foreign Application Priority Data

Jan. 13, 2017   (CN) .......................... 2017 1 0024095

(51) Int. Cl.
*G06F 3/044*   (2006.01)
(52) U.S. Cl.
CPC ................................... *G06F 3/044* (2013.01)
(58) Field of Classification Search
None
See application file for complete search history.

(56) References Cited

U.S. PATENT DOCUMENTS

| | | | |
|---|---|---|---|
| 2006/0227115 A1* | 10/2006 | Fry ....................... | G06F 3/0416 345/173 |
| 2008/0158176 A1* | 7/2008 | Land ..................... | G06F 3/0418 345/173 |
| 2008/0158182 A1* | 7/2008 | Westerman ........... | G06F 3/0416 345/173 |
| 2011/0216016 A1* | 9/2011 | Rosener ................. | G06F 3/041 345/173 |
| 2014/0022206 A1* | 1/2014 | van de Waerdt ....... | G06F 3/044 345/174 |
| 2014/0198059 A1* | 7/2014 | Gu ......................... | G06F 3/041 345/173 |
| 2015/0109243 A1* | 4/2015 | Jun ........................ | G06F 3/044 345/174 |

* cited by examiner

*Primary Examiner* — Amare Mengistu
*Assistant Examiner* — Sarvesh J Nadkarni
(74) *Attorney, Agent, or Firm* — Ferguson Braswell Fraser Kubasta PC

(57) ABSTRACT

A processing system includes sensor circuitry configured to obtain capacitive sensing signals from sensor electrodes, the sensor electrodes having baseline values, such that each sensor electrode has a corresponding baseline value. The processing circuitry is configured to be connected to the sensor circuitry and configured to determine, for the corresponding baseline value of a sensor electrode, a spatial consistency metric value using the various baseline values, set a baseline updating scheme for the sensor electrode based on the spatial consistency metric value, and update the corresponding baseline value of the sensor electrode according to the baseline updating scheme to obtain an updated corresponding baseline value.

20 Claims, 4 Drawing Sheets

ZERO-DIMENSIONAL BASELINE MANAGEMENT

CROSS-REFERENCE TO RELATED APPLICATIONS

This application claims priority under 35 U.S.C. § 119 to Chinese Patent Application Number 201710024095.4, filed on Jan. 13, 2017 and entitled, "ZERO-DIMENSIONAL BASELINE MANAGEMENT."

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a processing system for zero-dimensional baseline management. The processing system includes sensor circuitry configured to obtain capacitive sensing signals from sensor electrodes, the sensor electrodes having baseline values, such that each sensor electrode has a corresponding baseline value. The processing circuitry is configured to be connected to the sensor circuitry and configured to determine, for the corresponding baseline value of a sensor electrode, a spatial consistency metric value using the various baseline values, set a baseline updating scheme for the sensor electrode based on the spatial consistency metric value, and update the corresponding baseline value of the sensor electrode according to the baseline updating scheme to obtain an updated corresponding baseline value.

In general, in one aspect, one or more embodiments relate to an input device for zero-dimensional baseline management. The input device includes sensor electrodes, the sensor electrodes having baseline values, such that each sensor electrode has a corresponding baseline value. The input device further includes a processing system configured to be connected to the sensor electrodes. The processing system is configured to determine, for the corresponding baseline value of a sensor electrode, a spatial consistency metric value using the various baseline values, set a baseline updating scheme for the sensor electrode based on the spatial consistency metric value, and update the corresponding baseline value of the sensor electrode according to the baseline updating scheme to obtain an updated corresponding baseline value.

In general, in one aspect, one or more embodiments relate to a method for zero-dimensional baseline management. The method includes determining, for a corresponding baseline value of a sensor electrode, a first spatial consistency metric value using the baseline values of multiple sensor electrodes. The sensor electrodes have baseline values, such that the sensor electrodes each have a corresponding baseline value. The method further includes setting a baseline updating scheme for the sensor electrode based on the spatial consistency metric value, and updating the corresponding baseline value of the sensor electrode according to the baseline updating scheme to obtain an updated corresponding baseline value.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

Figure 1:
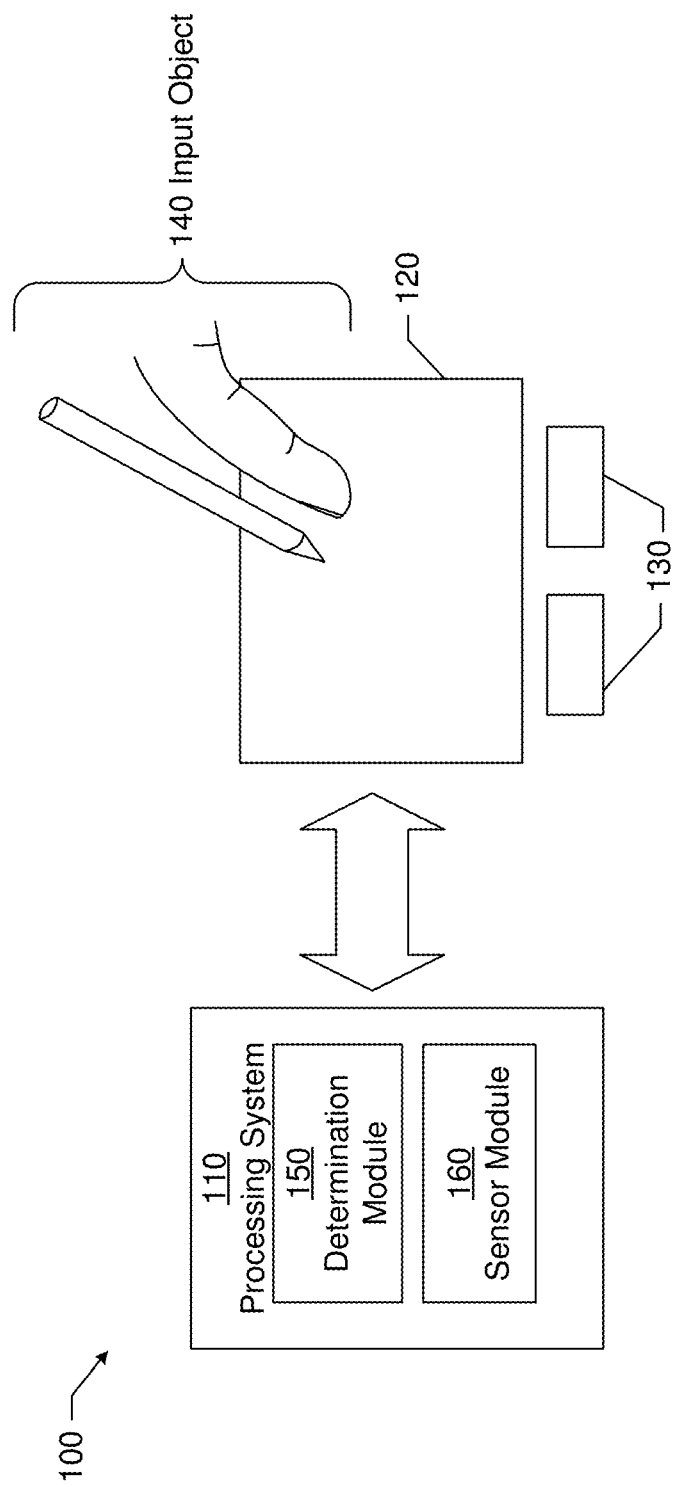
FIGS. 1, 2, 3, 4, and 5 are block diagrams of an example system that includes an input device in accordance with an embodiment of the invention.

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments are directed to zero-dimensional baseline management. Zero-dimensional baseline management is to manage the baseline of a zero-dimensional sensing region. A zero-dimensional sensing region has a single detectable point of contact with the surface of the sensing region. The zero-dimensional sensing region is not part of a larger sensing region (e.g., that together provide a position along a surface sensing region). Thus, the output of sensor electrode(s) of a zero-dimensional sensing region is only zero-dimensional positional information. In other words, zero-dimensional positional information is whether an input object is near or far to the surface of the zero-dimensional sensing region and whether contact or no contact exists with the surface of the zero-dimensional sensing region. Thus, the zero-dimensional sensing region is not combined with other zero-dimensional sensing regions to specify a point along the surface of the sensing region. Each zero-dimensional sensing region may be considered an isolated sensing region in that detection of an input object in the zero-dimensional sensing region is independent from other zero-dimensional sensing regions in accordance with one or more embodiments of the invention. An example of a zero-dimensional sensing region is a capacitive button. An example of a zero-dimensional sensing region and zero-dimensional sensing is described in U.S. Pat. No. 9,304,643, which is incorporated herein by reference in its entirety.

One or more embodiments perform zero-dimensional baseline management using the baseline of nearby zero-dimensional sensing regions. The baseline is an estimate of the background capacitance of the sensing region. In other words, while input object detection may be independent for the zero-dimensional sensing region, the baseline management (e.g., whether updating is performed and the rate of updating) is based on nearby zero-dimensional sensing regions. Notably, the value of the baseline of various zero-dimensional sensing regions may be determined independently in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in one or more sensing region (e.g., multi-dimensional sensing region (120), zero-dimensional sensing region (not shown)). Example input objects include fingers and styli, as shown in FIG. 1. Throughout the specification, the singular form of input object is used. Although the singular form is used, multiple input objects may exist in the multi-dimensional sensing region (120). Further, the particular input objects that are in the sensing region may change over the course of one or more gestures. To avoid unnecessarily complicating the description, the singular form of input object is used and refers to all of the above variations.

The sensing region encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements (e.g., sensor electrodes) for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations. The determination module may be implemented as processing circuitry, such as an application specific integrated circuit or hardware processor.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or another signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both updating the display and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
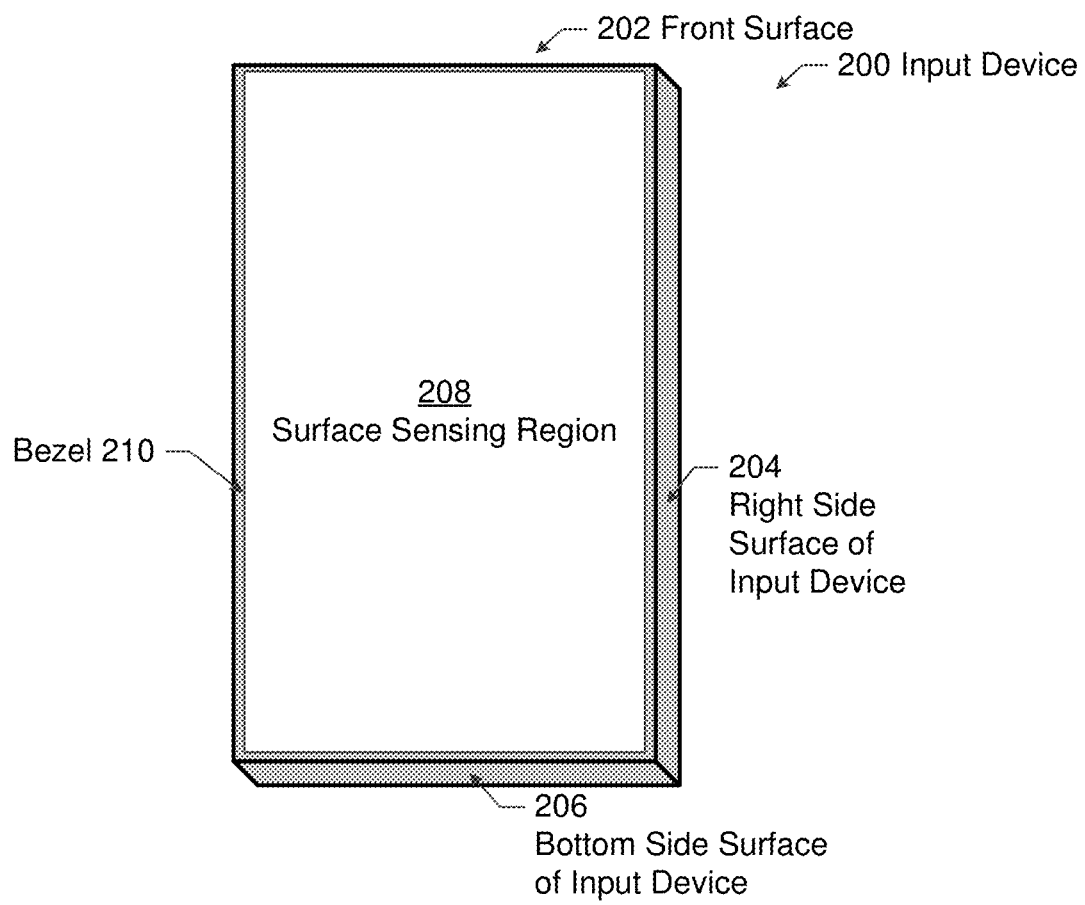

FIG. 2 shows an example three-dimensional view of an input device (200) in accordance with one or more embodiments of the invention. The input device (200) may be the same or similar to the input device shown in FIG. 1. The embodiment shown in FIG. 2 is for explanatory purposes only. The dimensions, size, shape, and curvature of the input device (200) may vary without departing from the scope of the invention. For example, although FIG. 2 shows the input device (200) as a cuboid, the input device may have one or more curved sides or surfaces, have different angles and different dimensions.

As shown in FIG. 2, the input device (200) includes a front surface (202), side surfaces (e.g., bottom side surface (206), top side surface (not shown), right side surface (204), and left side surface (not shown)), and back surface (not shown). The front surface (202) may include a surface sensing region (208) that is surrounded by a bezel (210). The surface sensing region (208) may correspond to the multi-dimensional surface sensing region discussed above with reference to FIG. 1. The surface sensing region (208) is a portion of the sensing region that may be touched by a person. For example, the surface sensing region may correspond to a transparent covering (e.g., glass or other material) above a display. Sensor electrodes may be below the transparent covering and within the input device (200). In one or more embodiments of the invention, a bezel (210) may surround the surface sensing region (208) and may frame the transparent covering.

As shown in FIG. 2, the front surface (202) is connected to side surfaces (e.g., right side surface of input device (204), bottom side surface of input device (206)) of the input device (200). In particular, the side surfaces connect the front surface to the back surface, which is substantially parallel to the front surface. The side surface may be substantially orthogonal to the front surface and to the back surface. In some embodiments, substantially orthogonal is completely orthogonal (e.g., as shown in FIG. 2). In other embodiments, substantially orthogonal may be curved and a virtual line connecting the start of the side at the front surface and the end of the side at the back surface is orthogonal to the front surface. Further, the side may include multiple components. The side may be formed as a single piece of material with the front surface, a single piece of material with the back surface, and/or both regions.

Figure 3:
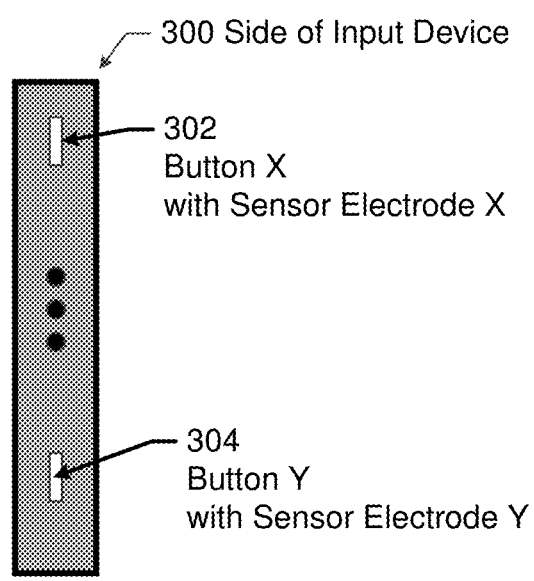

FIG. 3 shows a schematic diagram of a side of an input device (300) in accordance with one or more embodiments of the invention. The input device in FIG. 3 may be the same or similar as the input device shown in FIG. 1. As shown in FIG. 3, the input device may include capacitive buttons (e.g., button X (302), button Y (304)). The three collinear dots between the buttons in FIG. 3 indicate that more buttons may optionally exist without departing from the scope of the invention. In FIG. 3, each capacitive button is a zero-dimensional sensing region. In one or more embodiments, each capacitive button includes at least one corresponding sensor electrode. For example, button X may have a corresponding sensor electrode X and button Y may have a corresponding sensor electrode Y. The sensor electrode(s) for a button may be configured to perform capacitive sensing for the button, such as absolute and/or mutual capacitive sensing (discussed above with reference to FIG. 1). For example, for mutual capacitive sensing, a button may be associated with a sensor electrode pair that includes a transmitter electrode and receiver electrode. For absolute capacitive sensing, a button may have a single sensor electrode. Other configurations of sensor electrodes and sensing technologies may be used in FIG. 3 without departing from the scope of the invention.

While FIGS. 1-3 show a configuration of components, other configurations may be used without departing from the scope of the invention. For example, although FIGS. 2 and 3 show the front surface as having a multi-dimensional sensing region and the side of the input device having zero-dimensional sensing regions, one or more of the zero-dimensional sensing regions may be located on virtually any surface of the input device. Similarly, the side of the input device may include a multi-dimensional sensing region.

Figure 4:
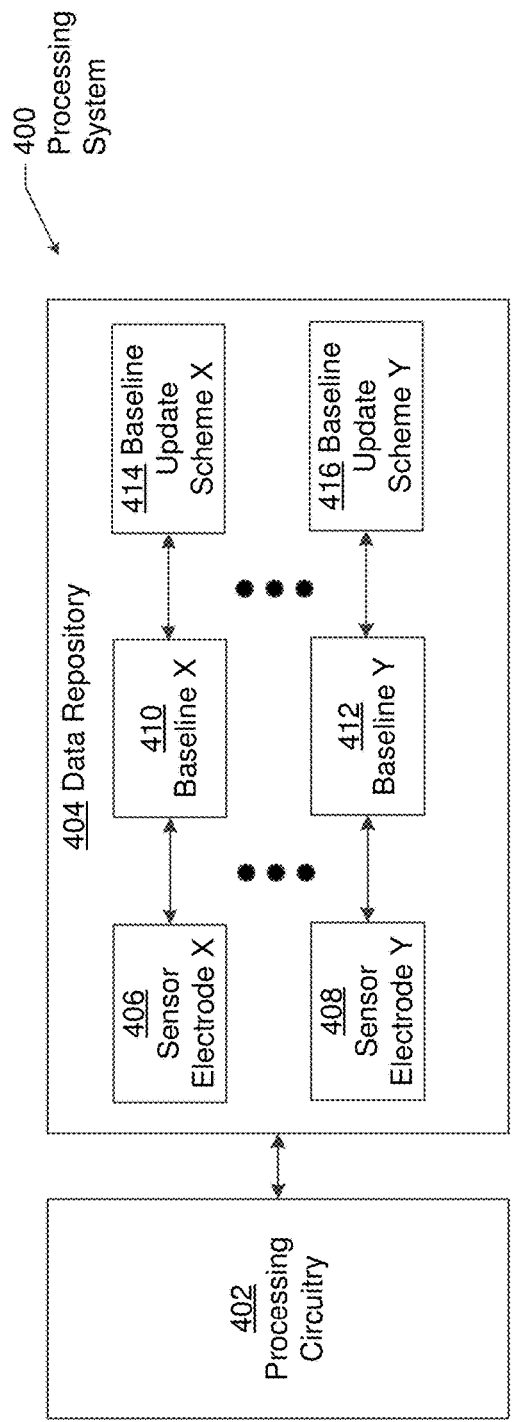

Turning to FIG. 4, FIG. 4 shows an example diagram of the processing system shown in FIG. 1 in accordance with one or more embodiments of the invention. As shown in FIG. 4, the processing system (400) may include processing circuitry (402) and/or another circuitry (e.g., sensor circuitry). The processing circuitry (400) is operably connected to a data repository (404). The data repository (404) is any type of storage unit and/or device (e.g., memory, database, collection of tables, or any other storage mechanism) for storing data. The data repository (404) includes functionality to relate the one or more sensor electrodes (e.g., sensor electrode X (406), sensor electrode Y (408)) of a zero-dimensional sensing region with a corresponding baseline (e.g., baseline X (410), baseline Y (412)) and corresponding baseline update scheme (e.g., baseline update scheme X (414), baseline update scheme Y (416)). In particular, for a particular zero-dimensional sensing region having one or more sensor electrodes, a corresponding value for the baseline and baseline update scheme may be stored in the data repository. The storage may be performed storing a sensing region identifier of the sensing region, a baseline update scheme identifier of the baseline update scheme and a value of the baseline.

The baseline related to the sensor electrode(s) of a zero-dimensional sensing region is an estimate of the background capacitance of the sensor electrode(s). In other words, the value of the baseline is an estimate of the value that is/would be determined for the sensing region when an input object is not present. For example, the capacitance of the sensing region may be affected by the grounding state, operating conditions, environment including other electronic devices, and other factors. Thus, the value of the baseline is an estimate of the noise affecting the capacitance measured using the corresponding sensor electrodes.

Generally, to perform capacitive sensing, the value of the baseline is subtracted from the raw value obtained for the sensor electrodes to obtain a delta value. The delta-value is used to obtain zero-dimension positional information. Other filters may be applied (e.g., temporal filters) as well. Once a miscalculation of the baseline, errors may persist until a new baseline is determined. For example, in some cases, the miscalculation of the baseline will result in the input device erroneously determining that an input object is in the zero-dimensional sensing region and/or the distance to the input object in the sensing region. By way of an example user experience, an erroneous baseline may cause the processing system to detect a selection of a capacitive button when an input object is not present.

The term "ghost object" refers to an incorrect determination of an input object being in the sensing region. As described above, a ghost object may result from miscalculated baseline values, but may also arise from other circumstances. By way of another example error, the miscalculation of a baseline may cause dead spots (i.e., negative ghost objects). Dead spots are when the presence of a real input object is not reported. A dead spot may occur, for example, when an object is on the sensing region when the baseline is captured and then removed from the sensing region. In such a scenario, the zero-dimensional sensing region in which the input object was located becomes a dead spot once the object is removed. By way of an example user experience, a dead spot may cause the processing system to not detect a selection of a capacitive button when the user has physically put an input object on the capacitive button.

Once such a ghost object (i.e., positive or negative ghost object) exists on the input device, the ghost object can create a variety of problems. For example, such a ghost object can cause proximity sensor device to generate unwanted input, or incorrectly or not respond to real input by the user. As such, such a ghost object may impair the usability of the input device and/or the associated electronic system. Further, because the ghost object may prevent the input device from recalculating the baseline, some problems may persist for a significant period of time.

The baseline update scheme (e.g., baseline update scheme X (414), baseline update scheme Y (416)) is the technique applied to the baseline (e.g., baseline X (410), baseline Y (412)) to change the baseline. In other words, the baseline update scheme defines whether and how fast to update the baseline. Because each zero-dimensional sensing region is independent, the presence or absence of an input object is independent across the sensing regions. Thus, the presence or absence of an input object may not be used to define whether to update the baseline for the zero-dimensional sensing region. In other words, the user's selection of a first capacitive button by placing a finger on the capacitive button has no relation to whether a second capacitive button is also selected in accordance with one or more embodiments of the invention.

One or more embodiments define the baseline update scheme based on a spatial consistency metric. The spatial consistency metric is a value estimating the consistency of a baseline to the baselines of nearby zero-dimensional sensing regions. In other words, the spatial consistency metric estimates the degree of variance between the values of baselines within a threshold distance. For example, although the sensor electrodes may be independent, one or more embodiments may assume that the background capacitance of the sensor electrodes in a region similarly. By way of a more specific example, if a user has an electronic device next to a first capacitive button, then other capacitive buttons may be affected by the electronic device based on the distance to the electronic device. However, because each zero-dimensional sensing region is different, some variation may occur between baselines. Thus, the updating of the baseline using the selected baseline update scheme is performed independently in accordance with one or more embodiments of the invention.

The threshold distance, which are used for the spatial consistency metric, may be defined using actual distance (e.g., within a predefined number of millimeters), number of zero-dimensional sensing regions, or other measure of distance. Further, the zero-dimensional sensing regions for a target zero-dimensional sensing region (i.e., target) that are within the threshold distance of the target may be identified in the data repository as being related to the target (e.g., by relating the target identifier to the identifiers of the zero-dimensional sensing regions that are within the threshold distance). By way of another example, which zero-dimensional sensing regions are within the threshold distance may be in program instructions executed by the processing circuitry.

Although FIG. 4 shows individual baseline update schemes for each baseline, multiple baselines may be related to the same baseline update scheme. In other words, the baseline update scheme may be determined at once for a collection of baselines.

Figure 5:
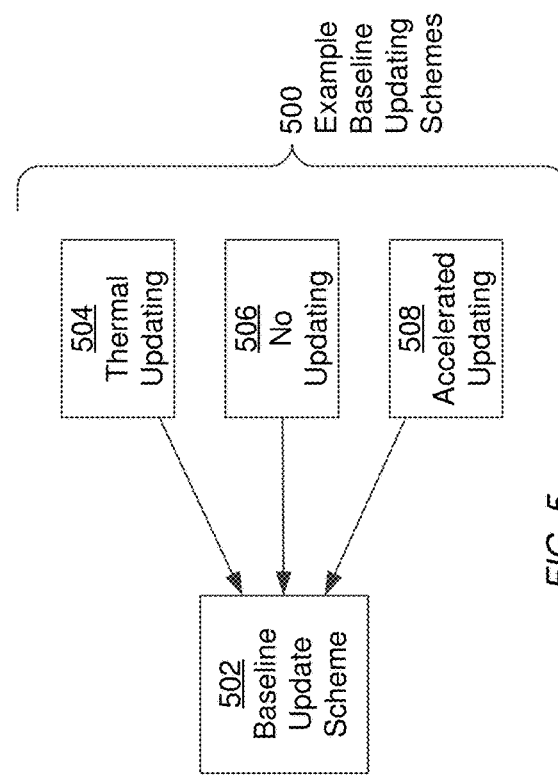

FIG. 5 shows examples of baseline update schemes (500) that may be selected for a baseline update scheme (502) in accordance with one or more embodiments of the invention. In the examples shown in FIG. 5, the baseline update schemes may define the baseline relaxation rate, or the speed at which the baseline is updated to account for the change in accordance with some embodiments. Baseline relaxation technique may additionally or alternatively refer to any equations used to adjust the baseline. The baseline relaxation rate may be the number of frames in which the baseline relaxation is performed.

Each frame is a time window during which a single capture of the status of the sensing region with respect to the presence any input objects is performed. During a frame, any and all input objects may be approximated as being stationary. In other words, the time window of the sensing frame is so short as to be effectively instantaneous to a human operator. In one or more embodiments of the invention, at the end of the frame, a report may be transmitted to other components of the processing system, input device, host system, or other device, or combination thereof. Each report includes zero-dimensional positional information regarding any input object in the zero-dimensional sensing region.

Continuing with FIG. 5, thermal updating (504) is to increase or decrease the baseline over several frames by the same amount between each frame. In other words, for any two consecutive frames, the difference between the baseline values of the consecutive frames is the same. The difference may be a static value that is the same regardless of the spatial metric consistency value or based on the spatial metric consistency value. By way of an example, the rate may be 1 femto-Ferads/second (1 fF/sec). Other rates may be used without departing from the scope of the invention. In one or more embodiments of the invention, whether the thermal updating (504) is to increase or decrease the baseline value is based on making the baselines for different zero-dimensional sensing regions more consistent (e.g., reducing the variation of baselines values) that are within the threshold distance.

No updating (506) is to not update the baseline value in accordance with one or more embodiments of the invention. In other words, no updating leaves the baseline as is currently present in accordance with one or more embodiments of the invention.

Accelerated updating (508) updates the baseline value using raw unprocessed data for the zero-dimensional sensing region. The raw unprocessed data is the value captured by the sensor electrodes that reflects the current measured capacitance of the sensing region, including any present noise. If the raw unprocessed data has a value of "r", then accelerated updating specifies the number of frames to which the baseline is the value of r. In other words, the baseline value is updated each frame so that after the specified number of frames, the value is r. However, because the value of the baseline may change each frame, the change or difference in the baseline value may be different between frames (e.g., r may be a moving target). Eq. 1 is an example of accelerated updating:

$$\text{Baseline\_next} = \text{Rawdata} - (\text{Rawdata} - \text{Baseline\_current}) \times e^{\frac{frameInterval}{tau}} \quad (\text{Eq. 1})$$

In Eq. 1, the Baseline_next is the updated baseline value, Rawdata is the raw value of the measured capacitance for the current frame, Baseline_current is the current baseline value for the current frame, frameInterval is the number of frames to update the baseline to the raw data, and tau is time in accordance with one or more embodiments of the invention. The value of frameInterval may be a static value or defined based on the speed of relaxation.

By way of another example of accelerated updating, the updating may be performed over a fixed number of frames (referred to below as "f"). For example, the correction at frame k, k=0, 1, ... f−1, may be calculated as the minimum of 1/(f−k) multiplied by the delta value for the frame. By way of another example of accelerated updating, the correction may be calculated and applied at the end of f frames as the average of errors over the f frames.

Although FIG. 5 shows three baseline updating techniques, other baseline updating techniques may be used without departing from the scope of the invention.

Figure 6:
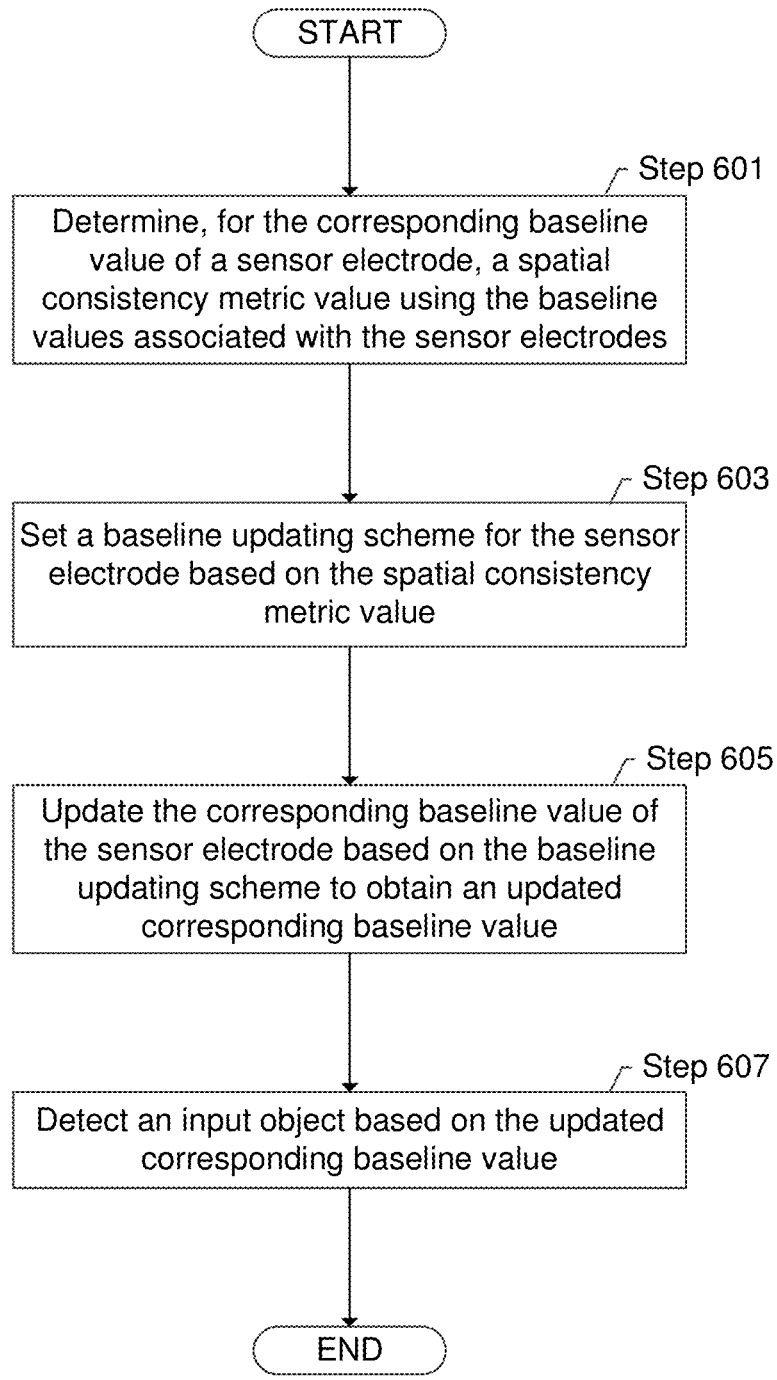
FIG. 6 is a flowchart in accordance with one or more embodiments of the invention.

FIG. 6 shows a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 601, for the corresponding baseline value of a sensor electrode, a spatial consistency metric value is determined using the baseline values associated with the sensor electrode. In one or more embodiments, determining the spatial consistency metric value is performed by obtaining the baseline values of zero-dimensional sensing regions within a threshold distance to generate obtained baseline values. The spatial consistency metric value may be defined as the maximum difference between the obtained values. By way of another example, the spatial consistency metric value may be the statistical variance calculated for the baseline values. By way of another example, the spatial consistency metric value may be calculated using the following Eq. 2.

$$SpatialCon = \frac{\text{Max}([baseline_0, \ldots, baseline_{k-1}]) - \text{Min}([baseline_0, \ldots, baseline_{k-1}])}{\text{Max}([baseline_0, \ldots, baseline_{k-1}]) + \text{Min}([baseline_0, \ldots, baseline_{k-1}])} \quad (\text{Eq. 2})$$

In Eq. 2, SpatialCon is the spatial consistency metric value, Max is the function maximum, Min is the function minimum, baseline is the baseline value and 0 . . . k−1 are the indexes for the obtained baseline values. For example, $baseline_0$ is the baseline value for the $0^{th}$ zero-dimensional sensing region, $baseline_{k-1}$ is the baseline value for the k−1 zero-dimensional sensing region. As shown, determining the spatial consistency metric value may include the processing circuitry calculating the value described above. In one or more embodiments, the spatial consistency metric value is calculated for each frame. In other embodiments, the spatial consistency metric value may be calculated periodically, such as every 10, 20, 100, etc. frames.

In Step 603, the baseline updating scheme is set for the sensor electrode based on the spatial consistency metric value. In one or more embodiments of the invention, the spatial consistency metric value is compared with a predefined consistency threshold to determine the baseline update scheme. If the spatial consistency metric value satisfies the consistency threshold indicating that the baseline values are within the consistency threshold degree of consistency, then a first baseline update scheme may be selected to perform no or slow updating. If the spatial consistency metric value does not satisfy the consistency threshold, then updating is performed.

Setting the baseline updating scheme may be further based on the detected presence or absence of an input object. For example, when no input object is detected and the spatial consistency metric value satisfies the consistency threshold (e.g., below the consistency threshold), then a thermal update scheme may be set. When an input object is detected and the spatial consistency metric value satisfies the consistency threshold, then the baseline update scheme may be set to no updating. When the spatial consistency metric value does not satisfy the consistency threshold, accelerated updating scheme may be used.

In Step 605, the corresponding baseline value of the sensor electrode is updated based on the baseline updating scheme to obtain an updated corresponding baseline value. In other words, after the baseline update scheme is set, the corresponding baseline value is updated for each consecutive frame based on the baseline update scheme. The updated baseline value replaces the prior baseline value for the zero-dimensional sensing region.

In Step 607, an input object is detected based on the updated corresponding baseline value. In one or more embodiments of the invention, the baseline value is subtracted from the raw value to obtain a delta value for the zero-dimensional sensing region. Further filtering may be applied, such as temporal filters to further process the raw and/or delta value. The delta value may be compared with a detection threshold. If the delta value satisfies the detection threshold, then the input object may be determined to be in the zero-dimensional sensing region. The magnitude of the delta value may be used to define the distance of the input object to the surface of the zero-dimensional sensing region.

By updating the baseline value, problems of positive and negative ghost input objects may be mitigated.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for zero-dimensional baseline management, the processing system comprising:
   sensor circuitry configured to obtain a plurality of capacitive sensing signals from a plurality of sensor electrodes, the plurality of sensor electrodes having a current plurality of baseline values, the plurality of sensor electrodes each having a corresponding baseline value in the current plurality of baseline values; and
   processing circuitry configured to be connected to the sensor circuitry and configured to:
      determine, for the corresponding baseline value of a first sensor electrode of the plurality of sensor electrodes, a first spatial consistency metric value using the plurality of baseline values, wherein the first spatial consistency metric value is an estimate of the degree of variance between the current plurality of baseline values,
      select a first baseline updating scheme from a plurality of baseline updating schemes for the first sensor electrode based on the first spatial consistency metric value,
         wherein the plurality of baseline updating schemes are for the first sensor electrode in absence of an input object being detected, and
      update the corresponding baseline value of the first sensor electrode according to the first baseline updating scheme to obtain a first updated corresponding baseline value.

2. The processing system of claim 1, wherein the processing circuitry is further configured to:
   detect the input object using the first sensor electrode based on the first updated corresponding baseline value.

3. The processing system of claim 1, wherein the plurality of sensor electrodes each correspond to a button.

4. The processing system of claim 1, wherein the first baseline updating scheme is set for the plurality of sensor electrodes.

5. The processing system of claim 1, wherein the first spatial consistency metric value is determined using a first subset of the current plurality of baseline values, and wherein the processing circuitry is further configured to:
   determine, for the corresponding baseline value of a second sensor electrode of the plurality of sensor electrodes, a first spatial consistency metric value using a second subset of the current plurality of baseline values,
   select a second baseline updating scheme from the plurality of baseline updating schemes for the second sensor electrode based on the second spatial consistency metric value, and
   updating the corresponding baseline value of the second sensor electrode according to the second baseline updating scheme to obtain a second updated corresponding baseline value.

6. The processing system of claim 5, wherein the processing circuitry is further configured to:
   detect an absence of the input object on a second sensor electrode,
   wherein the second baseline updating scheme is set to thermal updating based on the absence of the input object and the second spatial consistency metric value being less than a consistency threshold.

7. The processing system of claim 1, wherein the processing circuitry is further configured to:
   detect a presence of the input object on the first sensor electrode,
   wherein the first baseline updating scheme is set to no updating based on the presence of the input object and the second spatial consistency metric value being less than a consistency threshold.

8. The processing system of claim 1, wherein the processing circuitry is further configured to:
   detect a presence of the input object on the first sensor electrode,
   wherein the first baseline updating scheme is set to accelerated updating based on the presence of the input object and the second spatial consistency metric value being greater than a consistency threshold.

9. The processing system of claim 1, wherein the plurality of sensor electrodes receives absolute capacitive sensing signals.

10. The processing system of claim 1, wherein the plurality of sensor electrodes receives mutual capacitive sensing signals.

11. The processing system of claim 1, wherein the first spatial consistency metric is calculated based on adjacent sensor electrodes of the plurality of sensor electrodes.

12. An input device for zero-dimensional baseline management, the input device comprising:
    a plurality of sensor electrodes, the plurality of sensor electrodes having a current plurality of baseline values, the plurality of sensor electrodes each having a corresponding baseline value in the current plurality of baseline values; and
    a processing system configured to be connected to the plurality of sensor electrodes and configured to:
       determine, for the corresponding baseline value of a first sensor electrode of the plurality of sensor electrodes, a first spatial consistency metric value using the plurality of baseline values, wherein the first spatial consistency metric value is an estimate of the degree of variance between the current plurality of baseline values,
       select a first baseline updating scheme from a plurality of baseline updating schemes for the first sensor electrode based on the first spatial consistency metric value,
          wherein the plurality of baseline updating schemes are for the first sensor electrode in absence of an input object being detected, and
       update the corresponding baseline value of the first sensor electrode according to the first baseline updating scheme to obtain a first updated corresponding baseline value.

13. The input device of claim 12, wherein the processing system is further configured to:
    detect the input object using the first sensor electrode based on the first updated corresponding baseline value.

14. The input device of claim 12, wherein the first baseline updating scheme is set for the plurality of sensor electrodes.

15. The input device of claim 12, wherein the first spatial consistency metric value is determined using a first subset of the current plurality of baseline values, and wherein the processing system is further configured to:
 determine, for the corresponding baseline value of a second sensor electrode of the plurality of sensor electrodes, a first spatial consistency metric value using a second subset of the current plurality of baseline values,
 select a second baseline updating scheme from the plurality of baseline updating schemes for the second sensor electrode based on the second spatial consistency metric value, and
 update the corresponding baseline value of the second sensor electrode according to the second baseline updating scheme to obtain a second updated corresponding baseline value.

16. The input device of claim 15, wherein the processing system is further configured to:
 detect an absence of the input object on a second sensor electrode,
 wherein the second baseline updating scheme is set to thermal updating based on the absence of the input object and the second spatial consistency metric value being less than a consistency threshold.

17. The input device of claim 12, wherein the processing system is further configured to:
 detect a presence of the input object on the first sensor electrode,
 wherein the first baseline updating scheme is set to no updating based on the presence of the input object and the second spatial consistency metric value being less than a consistency threshold.

18. The input device of claim 12, wherein the processing system is further configured to:
 detect a presence of the input object on the first sensor electrode,
 wherein the first baseline updating scheme is set to accelerated updating based on the presence of the input object and the second spatial consistency metric value being greater than a consistency threshold.

19. A method for zero-dimensional baseline management, the method comprising:
 determining, for a corresponding baseline value of a sensor electrode of a plurality of sensor electrodes, a spatial consistency metric value using the current plurality of baseline values of the plurality of sensor electrodes, the plurality of sensor electrodes each having a corresponding baseline value in the current plurality of baseline values, wherein the first spatial consistency metric value is an estimate of the degree of variance between the current plurality of baseline values;
 selecting a baseline updating scheme from a plurality of baseline updating schemes for the sensor electrode based on the spatial consistency metric value,
  wherein the plurality of baseline updating schemes are for the sensor electrode in absence of an input object being detected; and
 updating the corresponding baseline value of the sensor electrode according to the baseline updating scheme to obtain an updated corresponding baseline value.

20. The method of claim 19, further comprising:
 detecting the input object using the sensor electrode based on the updated corresponding baseline value.

* * * * *